(12) United States Patent
Fuller

(10) Patent No.: US 9,390,131 B1
(45) Date of Patent: Jul. 12, 2016

(54) EXECUTING QUERIES SUBJECT TO DIFFERENT CONSISTENCY REQUIREMENTS

(71) Applicant: Alfred R. K. Fuller, San Carlos, CA (US)

(72) Inventor: Alfred R. K. Fuller, San Carlos, CA (US)

(73) Assignee: GOOGLE INC., Mountain View, CA (US)

(*) Notice: Subject to any disclaimer, the term of this patent is extended or adjusted under 35 U.S.C. 154(b) by 101 days.

(21) Appl. No.: 13/759,932

(22) Filed: Feb. 5, 2013

Related U.S. Application Data

(60) Provisional application No. 61/595,139, filed on Feb. 5, 2012.

(51) Int. Cl.
*G06F 17/30* (2006.01)

(52) U.S. Cl.
CPC .......... *G06F 17/30477* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 6,243,710 B1* | 6/2001 | DeMichiel et al. | 707/704 |
| 2008/0077558 A1* | 3/2008 | Lawrence et al. | 707/3 |
| 2008/0114816 A1* | 5/2008 | Shepherd | 707/201 |
| 2011/0004608 A1* | 1/2011 | Solaro et al. | 707/759 |
| 2011/0202541 A1* | 8/2011 | Permandla | G06F 17/30613 707/742 |
| 2012/0197928 A1* | 8/2012 | Zhang et al. | 707/769 |

* cited by examiner

*Primary Examiner* — Robert Beausoliel, Jr.
*Assistant Examiner* — Pedro J Santos
(74) *Attorney, Agent, or Firm* — Morgan, Lewis & Bockius LLP

(57) ABSTRACT

A server system having one or more processors and memory stores a plurality of entities in one or more databases, where the one or more databases do not guarantee strong consistency of the stored entities. The server system executes a first query against at least a first portion of the one or more databases to generate a first set of results that is not guaranteed to be strongly consistent. The server system also executes a second query, where executing the second query includes performing a consistency operation, the consistency operation guaranteeing that a second portion of the one or more databases is strongly consistent. After performing the consistency operation, the server system generates a second set of results from the second portion and merges the first set of one or more results and the second set of one or more results.

21 Claims, 9 Drawing Sheets

Entity Database
140

| | Keys 402 | Group IDs 404 | Properties 406 |
|---|---|---|---|
| Entity 0 | 10 | Group ID = Josh | Media = Video, Size=61MB |
| Entity 1 | 21 | Group ID = Andy | Media = Audio, Size=1MB |
| Entity 2 | 31 | Group ID = Gilbert | Media = Text, Size=0.1MB |

⋮

| | | | |
|---|---|---|---|
| Entity 120 | 22 | Group ID = Andy | Media = Video, Size=100MB |
| Entity 121 | 11 | Group ID = Josh | Media = Audio, Size=12MB |
| Entity 122 | 23 | Group ID = Andy | Media = Video, Size=61MB |

⋮

| | | | |
|---|---|---|---|
| Entity 700 | 12 | Group ID = Josh | Media = Text, Size=0.5MB |
| Entity 701 | 32 | Group ID = Gilbert | Media = Image, Size=6.1MB |
| Entity 702 | 13 | Group ID = Josh | Media = Text, Size=0.1MB |

Index
142

| Keys 402 | Group ID 404 | Properties 406 | |
|---|---|---|---|
| Entity 1 | Group ID = Andy | Media = Audio, Size=1MB | 21 |
| Entity 120 | Group ID = Andy | Media = Video, Size=100MB | 22 |
| Entity 122 | Group ID = Andy | Media = Video, Size=61MB | 23 |
| ⋮ | | | |
| Entity 2 | Group ID = Gilbert | Media = Text, Size=0.1MB | 31 |
| Entity 701 | Group ID = Gilbert | Media = Image, Size=6.1MB | 32 |
| ⋮ | | | |
| Entity 0 | Group ID = Josh | Media = Video, Size=61MB | 10 |
| Entity 121 | Group ID = Josh | Media = Audio, Size=12MB | 11 |
| Entity 700 | Group ID = Josh | Media = Text, Size=0.5MB | 12 |
| Entity 702 | Group ID = Josh | Media = Text, Size=0.1MB | 13 |
| ⋮ | | | |

Figure 4B

Transaction Log
143

| Transaction Payload | Target Information | |
|---|---|---|
| Remove | Entity with Key=32 | 402 |
| Transaction Payload | Target Information | 404 |
| | | 406 |
| Transaction Payload | Target Information | 408 |
| Add | Entity with Key=33 | 410 |

Figure 4C

EXECUTING QUERIES SUBJECT TO DIFFERENT CONSISTENCY REQUIREMENTS

RELATED APPLICATIONS

This application claims priority to U.S. Provisional Patent Application No. 61/595,139, filed Feb. 5, 2012, entitled "Executing Queries Subject to Different Consistency Requirements" which is incorporated herein by reference in its entirety.

BACKGROUND OF THE INVENTION

Every day, in response to user queries, millions of data operations are carried out. In particular, data operations such as update, add or remove operations, also result in changes of entities stored in a database. In a large-scale database system, where databases and their replicas are often distributed across multiple database servers, in many situations not all write operations are immediately applied across the multiple database servers. In other cases, data operations are applied in one database but not all replicas of the database. Notwithstanding delays in applying data operations to entities stored in a database or its replicas, users expect some entity changes to become immediately observable, such as entity changes that result from their own recent activity.

SUMMARY

The disclosed embodiments relates generally to distributed client-server computer network systems, and in particular, to a system and method for executing queries. In some databases, every data operation submitted to a database is applied and resulting entity changes populated to all replicas before query results can be generated. This solution ensures that queries against the database produce strongly consistent (e.g., up-to-date) data. However, for databases that are distributed across multiple database servers and accessed by large numbers of users, requiring strong consistency for all queries can be inefficient and reduce response times by requiring large numbers of data operations to be completed prior to processing a search query. In contrast, in databases where there are no consistency guarantees, a user may make changes to data and subsequently submit a request that should show this user's recent activity, but this activity will not always be shown in the results (e.g., if the user's recent activity has not yet been processed). This lack of strong consistency can result in inefficiencies as users re-enter data and/or try to ascertain whether the database has suffered an error or data loss. These and other problems with conventional approaches to processing database queries described above are reduced or eliminated by the systems and methods described below.

Thus, in many situations it would be advantageous to provide a system and method that avoid a full application of all recorded data operations in response to each user query, but still meets a user's expectation on observable entity changes. In particular, an approach that selectively guarantees strong consistency in response to user queries (e.g., by applying selected data operations in response to a user query), can ensure entity changes having particular relevancy to a user query are reflected and observable in query results provided to the user, thereby providing many of the benefits of strong consistency without the attendant costs of guaranteeing strong consistency across all results for all queries.

In some embodiments, a method is performed at a server system having one or more processors and memory storing one or more programs for execution by the one or more processors so as to perform the method. The method includes storing a plurality of entities in one or more databases, where the one or more databases do not guarantee strong consistency of the entities stored. The method further includes executing a first query against at least a first portion of the one or more databases to generate a first set of one or more results, where the first set of one or more results is not guaranteed to be strongly consistent; executing a second query by performing a consistency operation—the consistency operation guaranteeing that a second portion of the one or more databases is strongly consistent—and generating a second set of one or more results from the second portion of the one or more databases. The method also includes merging the first set of one or more results and the second set of one or more results.

In accordance with some embodiments, a computer system (e.g., a client system or server system) includes one or more processors, memory, and one or more programs. The one or more programs are stored in memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 4A is a block diagram illustrating an entity database, in accordance with some embodiments.

FIG. 4B is a block diagram illustrating a set of indexes or index portions for a plurality of entities, in accordance with some embodiments.

FIG. 4C is a block diagram illustrating a transaction log, in accordance with some embodiments.

DESCRIPTION OF EMBODIMENTS

It will be understood that, although the terms "first," "second," etc. may be used herein to describe various elements, these elements should not be limited by these terms. These terms are only used to distinguish one element from another. For example, a first request could be termed a second request, and, similarly, a second request could be termed a first request, without changing the meaning of the description, so long as all occurrences of the "first request" are renamed consistently and all occurrences of the second request are renamed consistently. The first request and the second request are both requests, but they are not the same request.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of executing queries, where a subset of the query is executed on a portion of the database that is guaranteed to be strongly consistent so as to enable the query result be produced efficiently.

Figure 1:
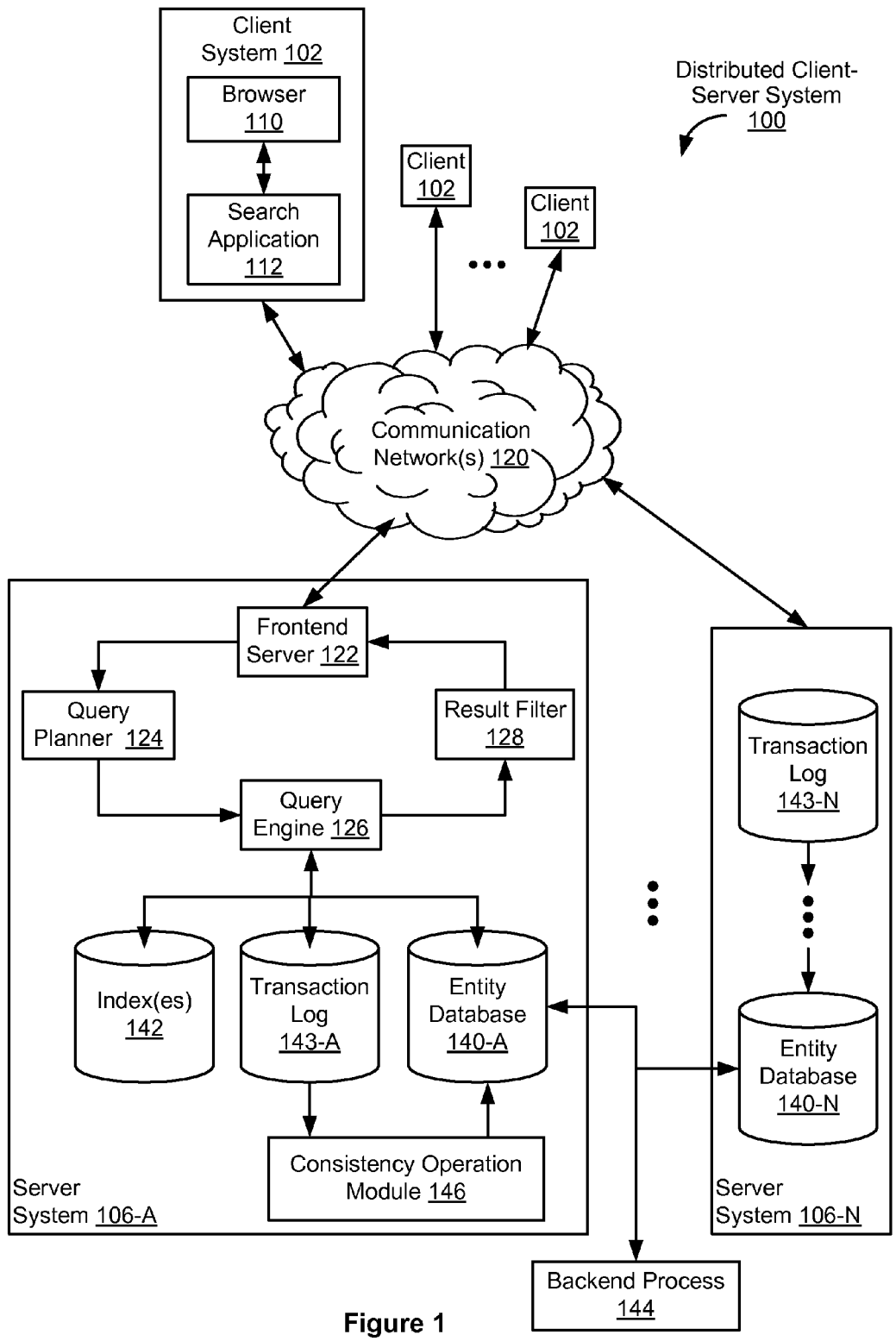
FIG. 1 is a block diagram illustrating a distributed client-server system, in accordance with some embodiments.

FIG. 1 includes a block diagram illustrating an exemplary distributed client-server system 100 for transmitting database queries. Distributed Client-Server System 100 includes one or more Client System(s) 102 (each of which is referred to herein as "Client 102"), Server System(s) 106-A . . . 106-N (respectively referred to herein as "Server 106") and a Communication Network 120 for connecting Clients 102 to Servers 106. Communication Network 120 optionally includes the Internet, one or more local area networks (LANs), one or more wide area networks (WANs), other types of networks, or a combination of such networks.

Client 102 optionally includes Browser 110 and/or Search Application 112. Browser 110 can be a general purpose Internet browser (sometimes called a Web browser) having a browser window used for displaying a query entry interface and query results. A web application user interface is optionally implemented using hypertext markup language (HTML) or extensible markup language (XML) elements that are rendered by Browser 110. Alternatively, a query is, optionally, submitted via a standalone Search Application 112. After a user submits a request for representations of entities matching a query through Browser 110 or a stand-alone Search Application 112, Client 102 relays the request to Server 106 via Communication Network 120. Server 106 identifies a plurality of matching entities and transfers search results including representations of the matching entities and, optionally, a set of display information back to Client 102. Search Application 112 and/or Browser 110 uses the search results and display information to render a set of search results at Client 102.

In some embodiments, Server System 106 includes Frontend Server 122, Query Planner 124, Query Engine 126, Result Filter 128, Entity Database 140, one or more Indexes 142, Transaction Log 143, and Consistency Operation Module 146. Frontend Server 122 relays a query received from Clients 102 to Query Planner 124, and after the client query is executed, query results from Result Filter 128 back to Clients 102. Query Planner 124 generates one or more queries based on syntax of the client query, logical relationships between database entities relevant to the client query, and/or other criteria, and transmits the one or more queries to Query Engine 126. Query Engine 126 executes the one or more queries to retrieve entities matching the one or more queries from Entity Database 140. In some embodiments, Query Engine 126 identifies entities matching the one or more queries using one or more entity indexes. In some embodiments, the one or more queries are not executed until Consistency Operation Module 146 has applied one or more write operations recorded in Transaction Log 143 to Entity Database 140. After the one or more queries are executed, query results are transmitted from Query Engine 126 to Result Filter 128, where they are filtered and further transmitted to Frontend Server 122, and then to Client 102.

In some embodiments, where there are multiple server systems (e.g., Server System 106-A and Server System 106-N) that include replicas of Entity Database 140 (e.g., Entity Database 104-A and Entity Database 140-N), Backend Process 144 communicates with the multiple server systems to synchronize entity changes between replicas of Entity Database 140. In some embodiments, Backend Process 144 is a background process that scans a set of databases (e.g., the Entity Database replicas) for rows that need to be synced. In some implementations, where multiple replicas of a database are stored in multiple Servers 106, when a data operation is performed, Servers 106 attempt to perform the data operation on all replicas of the database. If the attempt to perform the write operation on all replicas of the database fails, the entity is marked as needing to be synced, and Backend Process 144 eventually identifies this entity as needing to be synced (e.g., during a scan of the databases) and performs a sync operation to synchronize the entity across the replicas of the database.

Figure 2:
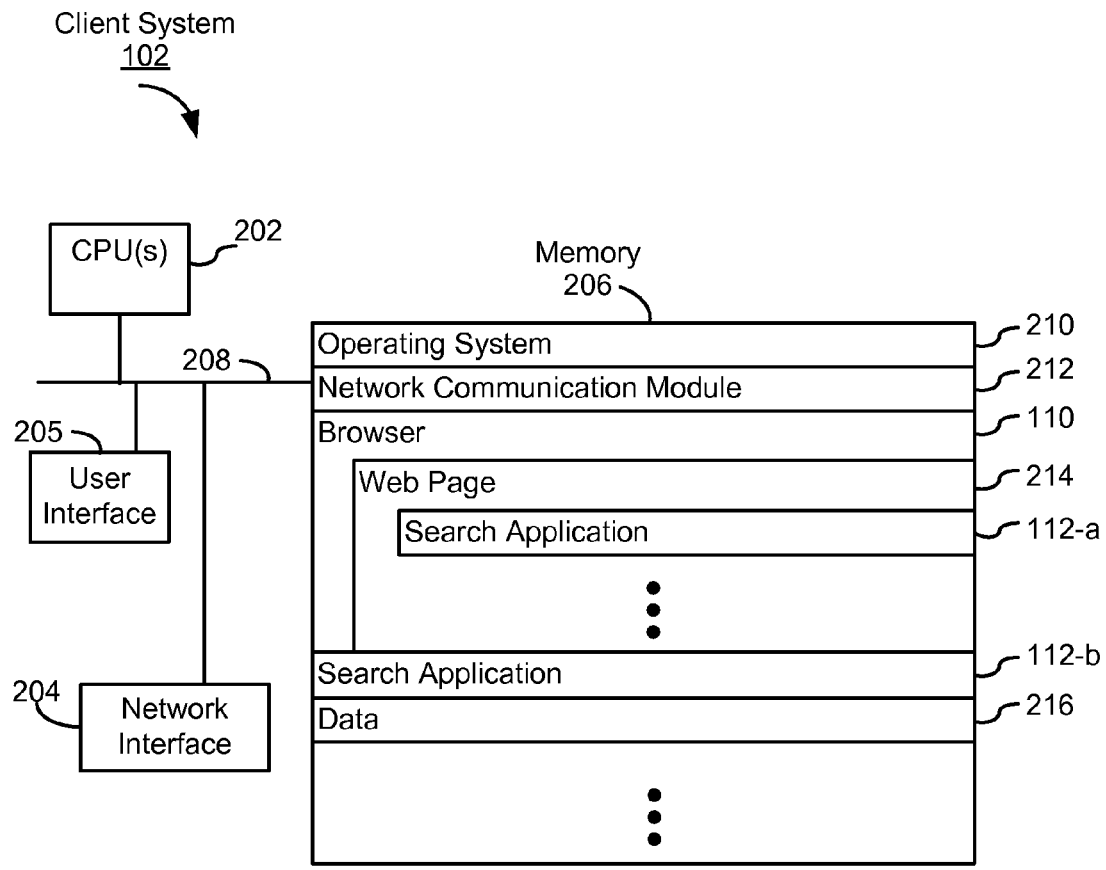
FIG. 2 is a block diagram illustrating a client system, in accordance with some embodiments.

FIG. 2 is a block diagram illustrating a Client System 102 (also referred to herein as "Client 102") in accordance with some embodiments. Client 102 typically includes one or more processing units CPU(s) 202 (also herein called processors), one or more network or other Communication Interfaces 204, Memory 206 a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 that includes procedures for handling various basic system services and for performing hardware dependent tasks;

Network Communication Module (or instructions) 212 that is used for connecting Client 102 to other computers (e.g., Server 106) via one or more Network Interfaces 204 (wired or wireless) and one or more Communication Networks 120 (FIG. 1), such as the Internet, other wide area networks, local area networks, metropolitan area networks, and so on;

Web Browser 110 for loading web pages such as a Search Web Page 214, which optionally includes code for executing a Search Application 112-*a* as an embedded application in Search Web Page 214, where Search Application 112-*a* sends requests to Server 106 and displays data received from Server 106;

dedicated Search Application 112-*b* (e.g., a stand-alone email client) for transmitting queries to Server 106 and displaying query results received from Server 106; and optionally, Data 216 includes cached search data (e.g., recently accessed query results, recent queries, etc.) corresponding to one or more prior queries.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 may store additional modules and data structures not described above.

Figure 3:
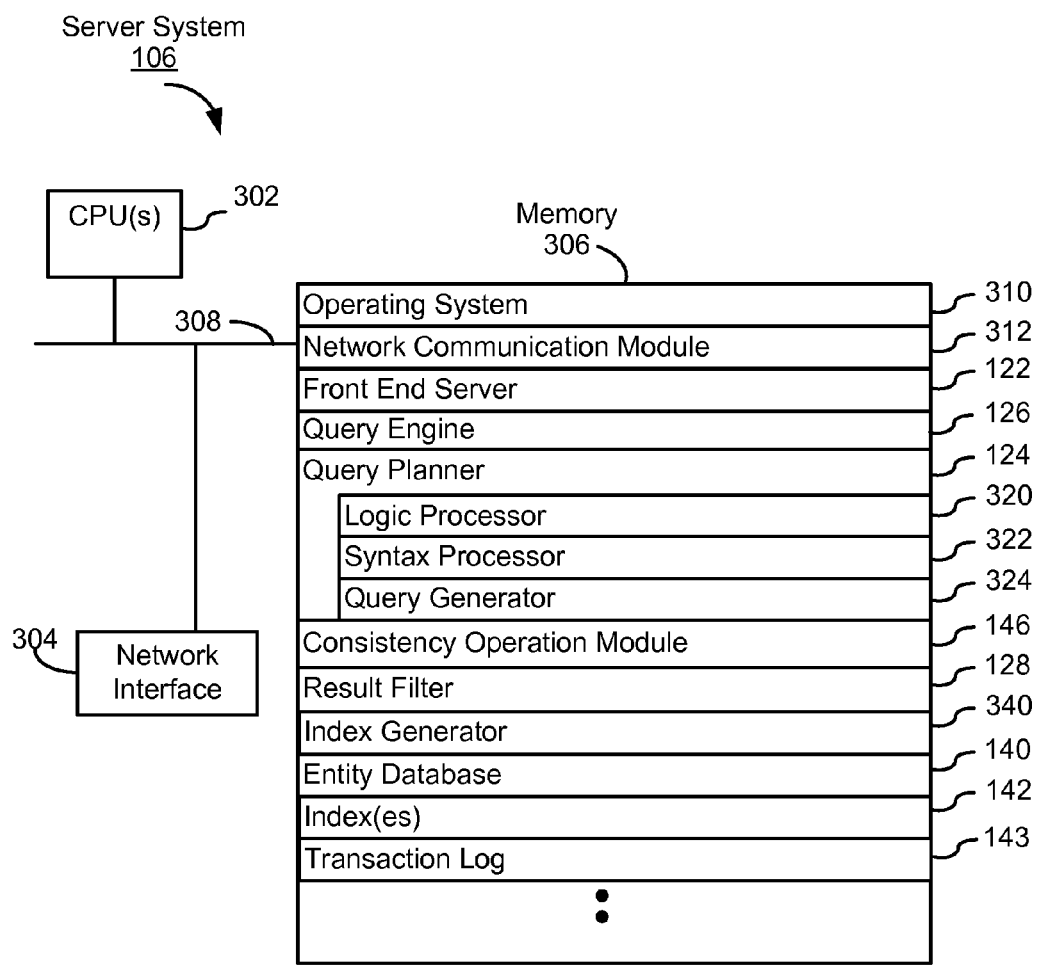
FIG. 3 is a block diagram illustrating a server system, in accordance with some embodiments.

FIG. 3 is a block diagram illustrating a Server System 106 (also referred to herein as "Server 106") in accordance with some embodiments. Server 106 typically includes one or more processing units CPU(s) 302 (also herein called processors), one or more network or other Communications Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312 that is used for connecting Server 106 to other computers (e.g., Client 102) via one or more Network Interfaces 304 (wired or wireless) and one or more Communication Networks 102 (FIG. 1), such as the Internet, other wide area networks, local area networks, metropolitan area networks, and so on;

Frontend Server 122 for coordinating communications between Server 106, Clients 102, Result Filter 128, and any other computer systems with which Server 106 communicates;

Query Planner 124 for generating one or more queries from a client-specified query received from Clients 102 and transmitting the one or more queries to Query Engine 126 for execution; in some implementations Query Planner 124 includes one or more of:

Logic Processor 320 for detecting logical relationships between query terms (e.g., search terms) in the client-specified query and optionally using the logical relationships to divide the query terms into one or more portions (e.g., sub-queries);

Syntax Processor 322 for parsing syntax of the client-specified query to determine the presence of consistency requirements, if any, to which the client-specified query or portions thereof are subject; and Query Generator 324 for generating one or more queries from the client-specified query in accordance with information from Logic Processor 320 and/or Syntax Processor 322 (e.g., splitting a particular portion of a client-specified query into two or more queries where the two or more queries are subject to different consistency requirements);

Query Engine 126 for executing the one or more queries received from Query Planner 124 and transmitting query results to Result Filter 128;

Consistency Operation Module 146 for applying write operations recorded in Transaction Log 143 to Entity Database 140;

Result Filter 128 for merging and filtering query results received from Query Engine 126 and transmitting the filtered results to Front End 122;

Index Generator 340 for generating indexes for use in executing search queries, in some implementations Index Generator 340 generates a large number of indexes (e.g., at least one index for each property that can be used to sort and/or filter search results) so that for each possible combination of filters and sort orders in a query, there exists an index including an index portion where the index entries matching the combination of filters are arranged in a contiguous block of index entries sorted in the sort order;

Entity Database 140 for storing entities or information about entities;

one or more Indexes 142 for storing information about entities and properties of the entities, typically the Indexes 142 are each sorted in accordance with values of the properties for the entities, as described in greater detail below with reference to FIGS. 4A-4D; and Transaction Log 143 for recording data operations that have been requested and, optionally, acknowledged but not yet applied to entities stored in Entity Database 140.

In some implementations, each of the above identified elements is stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows a "Server System" 106, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Server System 106 and how features are allocated among them will vary from one implementation to another, and optionally depends in part on the amount of data traffic that the system must handle during peak usage periods as well as during average usage periods.

Entities and Indexes

FIG. 4A illustrates an example of entities stored in Entity Database 140, in accordance with some embodiments. For example, in Entity Database 140, entities have Keys 402, Group IDs 404, and Properties 406. In some embodiments, a respective Key 402 uniquely identifies an entity. In some implementations, a key also includes an Entity ID associated with the entity, for example an identifier assigned by Server 106). An entity optionally includes a Group ID 404, which provides information indicating that the entity is part of a respective group of entities (e.g., other entities that share the same Group ID).

In some embodiments, entities having a same respective Group ID are stored consecutively in Entity Database 140 (e.g., in a portion or partition of Entity Database 140 that is associated with the respective Group ID). In other Embodiments, entities having the same Group ID are not stored consecutively. For example, Entity 2 and Entity 701, both having Group ID=Gilbert have the same Group ID but are not stored consecutively in Entity Database 140. In some embodiments, groups of entities in a database are identified using one or more indexes that are sorted in accordance with the Group IDs or other properties of the entities so that index entries for entities having a same respective Group ID (or other property) are located proximate to each other in an index portion that is associated with the Group ID (or other property).

In some embodiments, an entity also has one or more properties. The properties optionally have one or more possible values of different types, including one or more of: integers, floating point values, strings, dates, and binary data. In some embodiments, a property for a respective entity has a single value. In other embodiments, a property for a respective entity is enabled to have one or more values. For example, the property "Media" has a plurality of possible values including one or more of "Video," "Audio" and/or "Text." In some implementations, a query including a filter (e.g., Media=Video) for a property with multiple values tests whether any of the values meets the filter. Thus, in these implementations, if a respective entity includes properties A=1 and A=2, a search for all entities with the property A=1 will return the respective entity. Additionally, it should be understood that the values of these properties can be used either as predefined sort parameters for sorting indexes or to determine whether respective entities meet filter criteria. An entity can be requested by Client 102 either by requesting an entity directly by transmitting a request for the entity associated with a particular key, or by transmitting a query that matches the entity's properties and causes Server 106 to identify the entity using the one or more indexes.

Alternatively, or in addition to using a separate predefined Group ID to identify groups of entities, as described above, the Keys 402 and/or Properties 406 shown in FIG. 4A are, optionally, used to identify groups of entities. Thus, in these implementations, the keys and/or properties serve the purpose of the Group IDs 404 shown in FIG. 4A and separate Group IDs are not needed.

In some embodiments, keys of entities in a group provide an indication of the membership of the entities in the group (e.g., a respective key of a respective entity includes information enables other entities associated with the respective entity to be identified). For example, the keys of all of the entities in a respective group of entities include a shared "group key" or a common ancestor key. In some implementations, entities stored in Entity Database 140 are organized in a tree-like structure and the key of a child entity includes a representation of the key of the parent entity. In these implementations, a group can be defined as all entities that are children of "entity X" or all entities that are related to "entity X." As one example, a search query specifies that results to a portion of the search query are to be strongly consistent for blog posts authored by a particular user, and content (e.g., blog comments) generated by a user are generated as child entities of an entity representing the user. In this example, keys of the blog comments (which each include a representation of the key of the entity representing the user) are used to identify a group of entities corresponding blog comments that were authored by the user (e.g., by identifying entities in a portion of an index that is sorted by key where the keys start with a key of the entity representing the user).

In some embodiments, a property of the entities that was not explicitly defined as a "Group ID" is used to identify a group of entities. For example, if a search query specifies that results to a portion of the search query are to be strongly consistent for blog comments that were posted today, the dates on which blog posts were posted will be used to identify a group of entities corresponding blog comments that were published today (e.g., by identifying entities in a portion of an index that is sorted by date where date="today").

FIG. 4B includes a block diagram illustrating a set of indexes for a plurality of entities, in accordance with some embodiments. In FIG. 4B Index 142 (of entities from Entity Database 140) is sorted in accordance with Group ID (e.g., in FIG. 4B the index entries are sorted monotonically in alphabetical order by Group ID). Thus, in FIG. 4B, the index entries in Index 142 are organized in groups in accordance with their respective Group IDs. For example, in FIG. 4B index entries for multiple entities (e.g., Entity 2 and Entity 701) having the same Group ID (e.g., Group ID=Gilbert) are organized consecutively in Index 142 despite the fact that the entities associated with those index entries are not stored consecutively in Entity Database 140, as illustrated in FIG. 4A. The sorting of Index 142 enables a group of entities to be identified quickly and efficiently even if the entities themselves are not stored consecutively in Entity Database 140.

FIG. 4C illustrates an example of a transaction log in accordance with some embodiments. Transaction Log 143, sometimes called a pending transaction log, includes a plurality of transaction entries, where the respective transaction entries include a transaction payload (e.g., instructions to perform a transaction operation) and transaction target information indicating a target of the transaction. In FIG. 4C, Transaction Log 143 includes transaction entries representing a plurality of data operations (e.g., Operations 402, 404, 406, 408 and 410). These data operations are interactions with data items (e.g., requests to read, write, delete and/or otherwise modify data items) that have been requested by respective clients but not yet been applied to entities stored in Entity Database 140. In some embodiments, or for some transactions, the transaction target information for respective transaction entries includes unique identifiers for the target entities (e.g., keys). In some embodiments, or for some transactions, the transaction target information for respective transaction entries includes information enabling the target entities to be identified using a search query (e.g., a set of properties and/or Group IDs to be used as query terms for a query). In Transaction Log 143 in FIG. 4C, Transaction Entry 404 corresponds to a "Remove" operation on the entity having Key=32. In this example, performing the data operation indicated by transaction entry 404 removes Entity 701, whose key=32, from Entity Database 140. However, in this example, before the data operation corresponding to transaction entry 404 is performed, Entity 701 continues to exist in Entity Database 140 (the dotted lines indicate the removal of Entity 701 is requested but not yet applied). In some embodiments, once a data operation corresponding to a transaction entry in Transaction Log 143 has been performed, the corresponding transaction entry is deleted from Transaction Log 143. Additionally, in Transaction Log 143 in FIG. 4C, Transaction Entry 410 corresponds to an "Add" operation to add a new entity having Key=33.

Figure 4D:
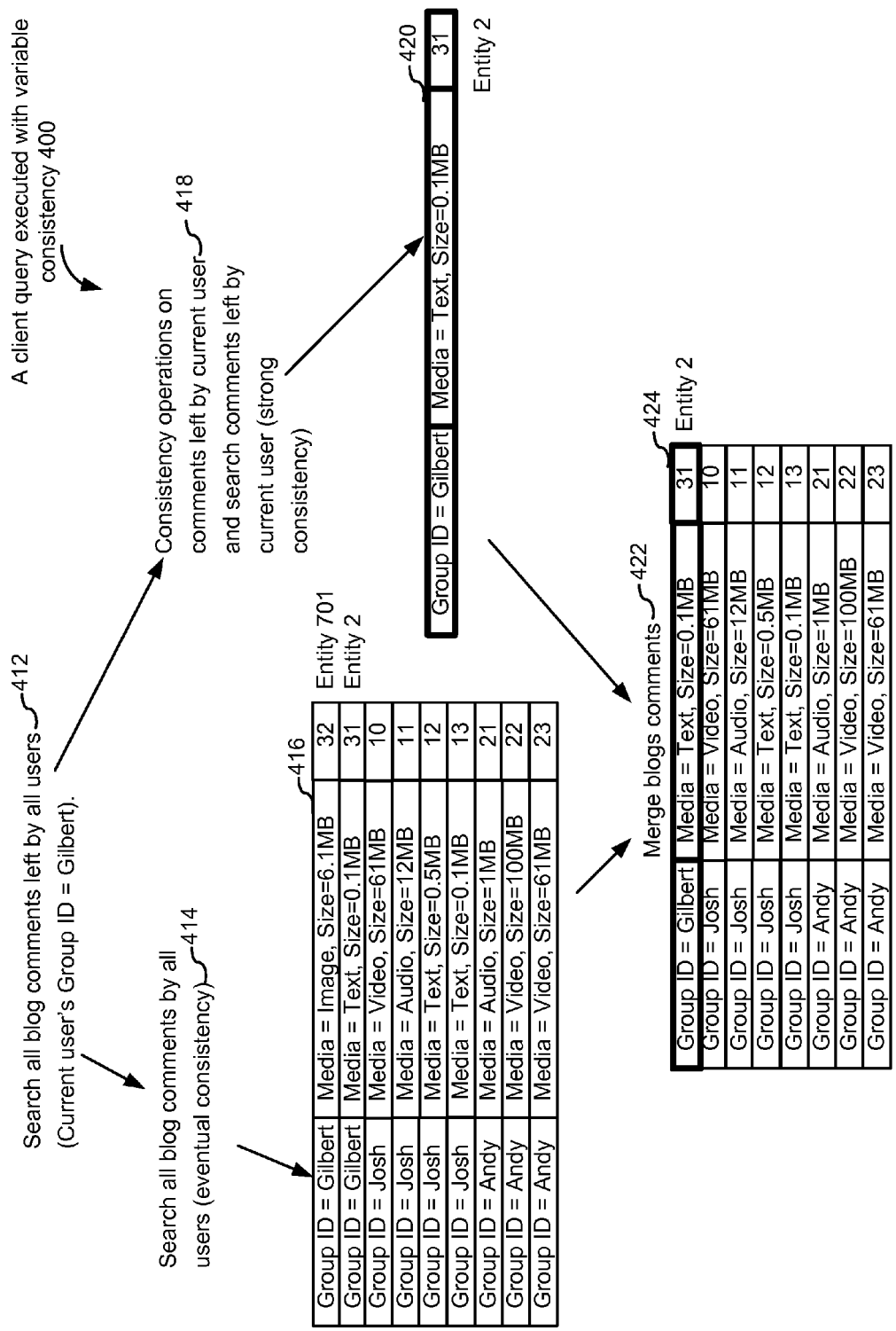
FIG. 4D is a block diagram illustrating an example of executing a query, in accordance with some embodiments.

FIG. 4D illustrates an example of a query that is executed as multiple queries that are subject to different consistency requirements (e.g., a first query with eventual consistency and second query with strong consistency). In some embodiments, a database or a portion of a database is strongly consistent if changes to entities that result from acknowledged data operations are visible to subsequent read operations that would return entities from the database or the portion of the database. In some embodiments, a database or a portion of a database are not strongly consistent if changes to entities that result from acknowledged data operations are not guaranteed to be visible to subsequent read operations that would return entities from the database or the portion of the database. However in some implementations, a database or portion thereof that is not strongly consistent can be made "eventually" consistent by running a background synchronization process (e.g., Backend Process 144 in FIG. 1) to synchronizes entities across one or more databases and associated replicas that have been added, deleted or modified. In other words, in some embodiments, a portion of a database is strongly consistent when all of the transaction logs for entities stored in the portion of the database have been applied, and a portion of a database is eventually consistent when there is no guarantee that all of the transaction logs for entities stored in the portion of the database have been applied but there is some background process that eventually applies transaction logs and synchronizes entities across the one or more databases and replicas thereof.

In the example shown in FIG. 4D, a current user (e.g., "Gilbert") submits a search Query 412 for blog comments left by all users (including the current user). In most situations, the current user will only have independent knowledge of data operations that have been performed on the user's own posts. As long as the blog comments left by other users are mostly up to date, it will generally not be obvious to the user if the results for the search for blog comments are not completely up to date (e.g., not strongly consistent) with respect to content (e.g., blog comments) generated by other users. However, if the user has changed (added or deleted) a blog comment and the change made by the user (e.g., the newly added or deleted blog comment) is not reflected in the results to the search for blog comments, the current user will likely be aware of the inconsistency and user experience will be degraded. Thus, in some embodiments, the user-submitted search query is divided into two search queries (e.g., Query 414 and Query 418) generated based on Query 412, where one of the search queries (e.g., Query 414, which is a search of all blog comments by all users, optionally including the current user) is eventually consistent, and the other search query (e.g., Query 416, which is a search of all blog comments by the current user) is strongly consistent.

In the example, shown in FIG. 4D, the data operation associated with transaction entry 404 in FIG. 4C (which removes Entity 701 from Entity Database 140) has been requested but has not yet been applied. Moreover, Query 414 is not guaranteed to have strong consistency, and thus Server 106 does not perform any operation to guarantee that the transaction logs for the searched portions of Entity Database 140 have been applied. Thus, in this example, Entity 701 continues to exist in Entity Database 140 and corresponds to one of the results in eventually consistent Query Results 416, where strong consistency is not guaranteed, even though Server 106 has received a request to delete Entity 701, which has been acknowledged and placed in Transaction Log 143. Similarly, other results in Query Results 416 may also correspond to entities that have been modified but the modifications are not yet observable because Query Results 416 is not strongly consistent (e.g., other results may be associated with corresponding data operations modifying or deleting the entities where the data operations have been acknowledged and placed in a transaction log but have not yet been applied).

In the example in FIG. 4D, Query 418, a query for a search of blog comments by current user, is executed with strong consistency. In some embodiments, Query 418 is executed in parallel with Query 414. In some embodiments, Query 414 and Query 418 are executed serially (e.g., Query 418 is executed before or after Query 414). In some embodiments, strong consistency is achieved by performing a consistency operation on entities relevant to Query 418 (e.g., entities related to the current user) before generating query results. In some embodiments, the consistency operation includes applying data operations involving entities relevant to a query—in this case, applying the data operation corresponding to Transaction Entry 404 from Transaction Log 143, because the data operation corresponding to Transaction Entry 404 involves Entity 701, which has a Group ID that matches the Group ID of the current user. After the data operation corresponding to Transaction Entry 404 is applied, Entity 701 is removed from Entity Database 140. After this consistency operation is performed, Query Result 420, including a result corresponding to Entity 2 but not a result corresponding to Entity 701 (which has been deleted), is then generated by running the query against the updated portion of Entity Database 140. Additionally, in some situations the transaction logs will include transaction entries corresponding to data operations adding one or more new entities to the group associated with the current user. In some of these situations, the newly added entities will also be included in Query Result 420 even though they would not necessarily be included in Query Result 416, as Query Result 416 was generated without guaranteeing strong consistency (e.g., without guaranteeing that the transaction logs had been applied).

At Step 422, eventually consistent Query Results 416 and strongly consistent Query Results 420 are merged into a merged set of Results 424 in accordance with some embodiments. In this example, before the query results are merged, the results corresponding to entities having Group ID=Gilbert (Entity 2 and Entity 701) are removed from Query Results 416 so as to remove any results that have been retrieved from the portion of Entity Database 140 against which the strongly consistent query (e.g., Query 418) was executed. Removing results from the eventually consistent query results that would have been retrieved by the strongly consistent query avoids both duplicating results in the merged set of query results and including results in the merged set of results that correspond to deleted entities. In this example, a merged set of Results 424 is generated by merging the modified Query Results 416 and Query Result 420 (the bold lines surrounding the result corresponding to Entity 2 in Query Result 422 indicates that it is the result corresponding to Entity 2 that was retrieved via strongly consistent Query Result 420).

Figure 5:
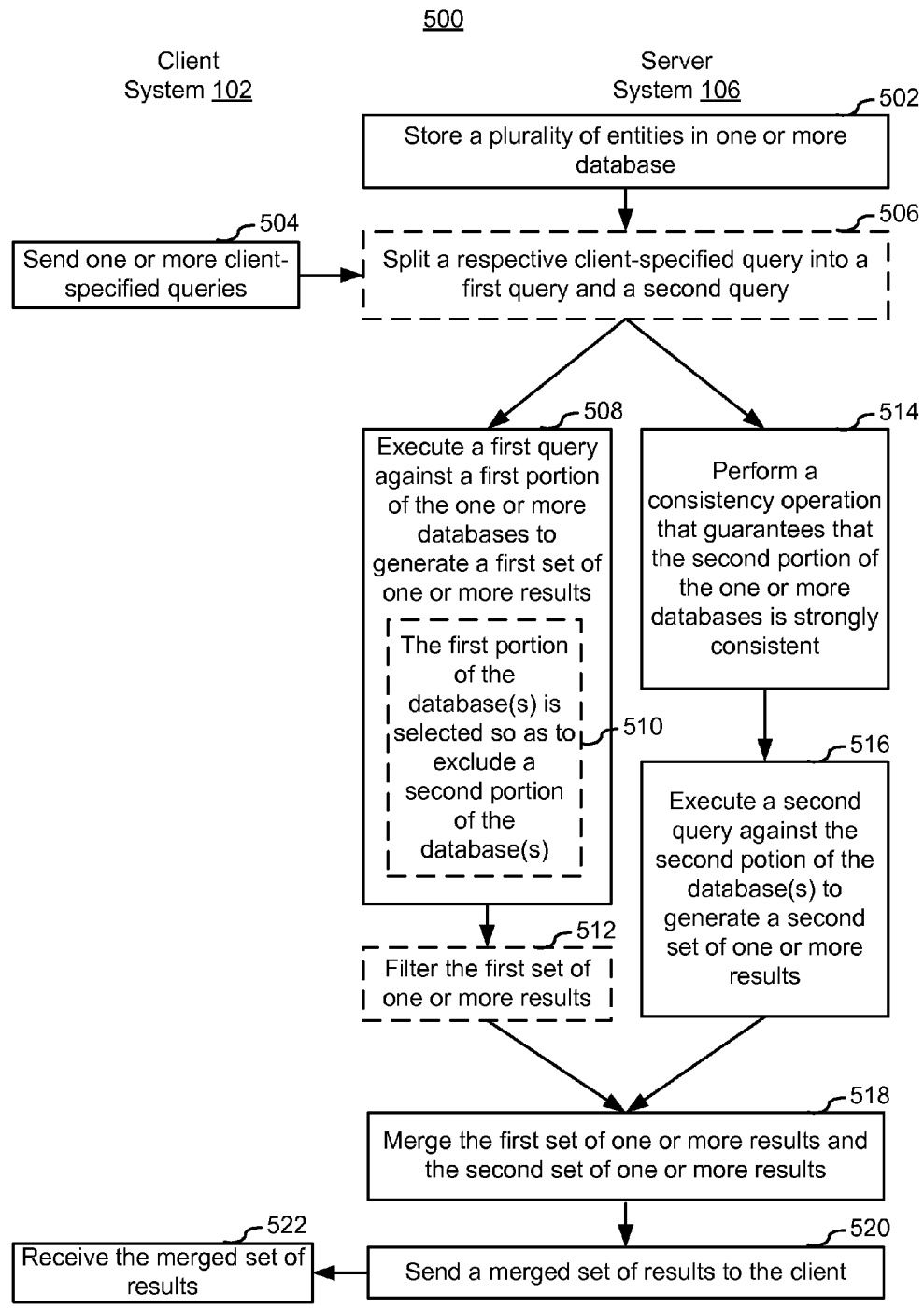
FIG. 5 includes a flow chart illustrating a method for processing a query, in accordance with some embodiments.

FIG. 5 includes a flowchart illustrating a method for receiving from a client system and executing queries with variable consistency at a server system and returning query results back to the client system, in accordance with some embodiments. Method 500 is, optionally, governed by instructions that are stored in a non-transitory computer readable storage medium and that are executed by one or more processors of one or more servers (e.g., Server 106, FIG. 3). Each of the operations shown in FIG. 5 typically corresponds to instructions stored in a computer memory or non-transitory computer readable storage medium (e.g., memory 306 of Server 106 in FIG. 3). In some implementations, the non-transitory computer readable storage medium includes a magnetic or optical disk storage device, solid state storage devices such as Flash memory, or other non-volatile memory device or devices. In some implementations, the computer readable instructions stored on the computer readable storage medium include one or more of: source code, assembly language code, object code, or other instruction format that is interpreted or executed by one or more processors. In various embodiments, some operations in method 500 may be combined and/or the order of some operations may be changed from the order shown in FIG. 5.

In some embodiments, a plurality of entities are stored (502) in the one or more databases on Server 106. In some embodiments, the one or more databases are stored across several Servers 106. For example, Entity Database 140 in FIG. 1 can include one or more databases spread across one or more Servers 106. In some embodiments multiple replicas of Entity Database 140 are stored on different servers (e.g., Server 106-A, Server 106-N, etc.)

Client 102 sends (504) one or more client specified queries to Server 106. In some embodiments, Server 106 splits (506) a single respective client-specified query into a first query and a second query. In some embodiments Client 102 sends two queries to Server 106, where the two queries have different consistency requirements. In other words, in some situations, the first and second queries described in greater detail below are generated by Server 106 from a common client-specified query while in other embodiments, the first and second queries are received from Client 102.

The first query is executed (508) against a first portion of the one or more databases to generate a first set of one or more results. In some embodiments, the first portion of the one or more databases against which the first query is executed is selected (510) so as to exclude a second portion of the one or more databases. In other words, in some implementations, the first portion of the one or more databases is selected so as to avoid generating duplicate results to those that will be retrieved by the second query (e.g., the query executed on the second portion of the database). Alternatively, or in addition, the first set of results is filtered (512) to remove results corresponding to entities that could have been retrieved by the second query.

With respect to the second query, which is optionally executed concurrently with execution of the first query, Server 106 first performs (514) a consistency operation that guarantees that the second portion of the one or more databases is strongly consistent (e.g., the transaction logs relating to entities that are stored in the second portion of the database are applied to the entities in the second portion of the database prior to executing the second query). In some situations, the consistency operation includes a determination that all of the relevant transaction logs have been applied, and thus the consistency operation does not necessarily include applying any additional transaction logs. After the consistency operation has been performed (e.g., applying relevant transaction logs to entities in the second portion of the database), the second query is then executed (516) against the second portion of the one or more databases, to generate a second set of one or more results. In some situations the first query and second query will be performed at different times instead of being performed concurrently. However, it is typically faster to run the first query and the second query in parallel, as the results of the first query and the results of the second query are generally independent of each other.

After the first query and the second query have been executed, the first set of one or more results are merged (518) with the second set of one or more results. The merged results are then sent (520) by Server 106 to Client 102, where the results are received (522) and optionally are further processed.

It should be understood that the particular order in which the operations in FIG. 5 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 600 (described herein with reference to FIGS. 6A-6B) are also applicable in an analogous manner to method 500 described above with respect to FIG. 5. For example, the client-specified query, consistency operation, portions of the databases, and search results described above with reference to method 500 may have one or more of the characteristics of the client-specified query, consistency operation, portions of the databases, and search results described herein with reference to method 600. For brevity, these details are not repeated here.

Figure 6A:
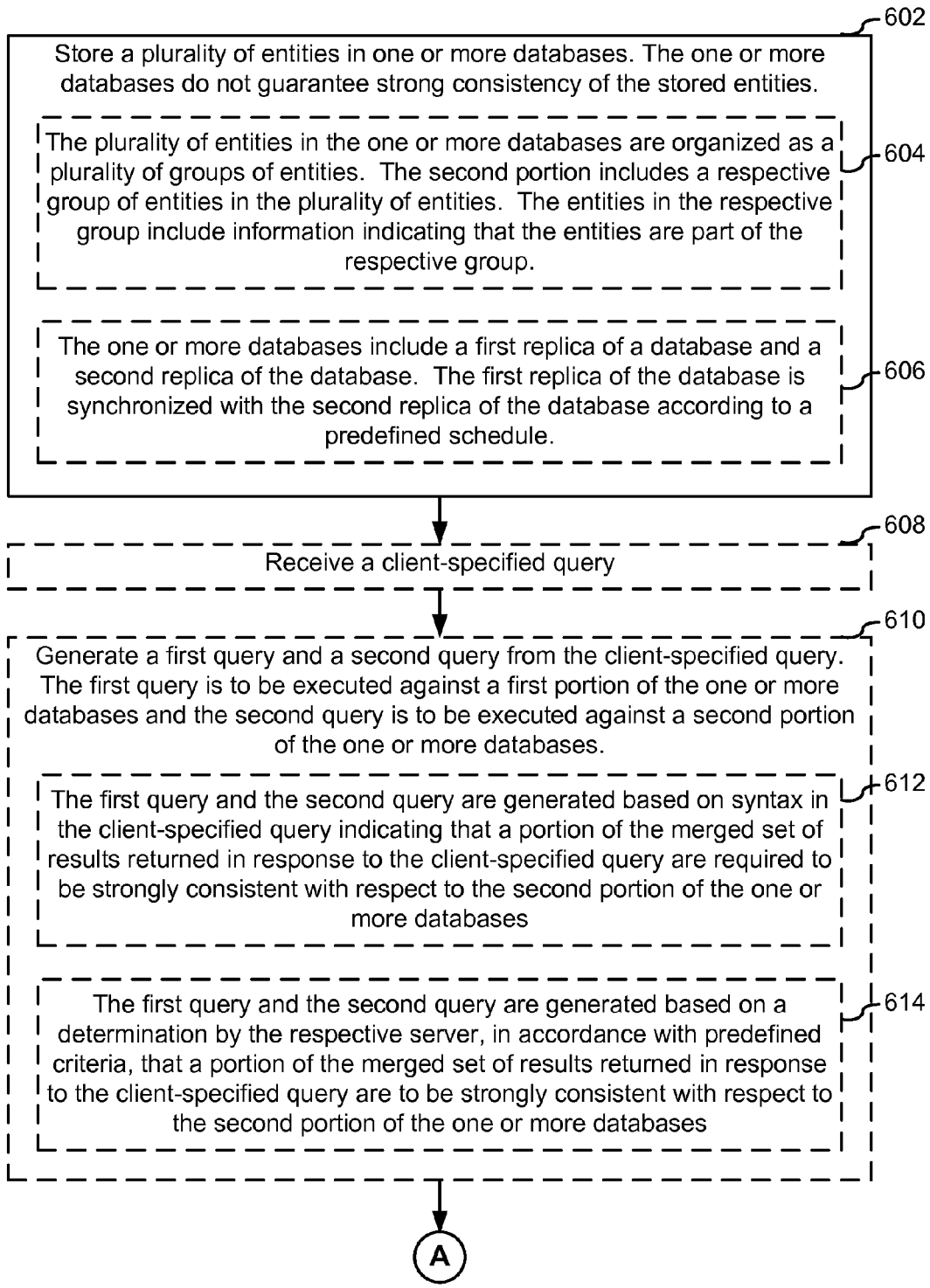
FIGS. 6A-6B include a flow chart illustrating a method for executing a query at a server system, in accordance with some embodiments.
Figure 6B:
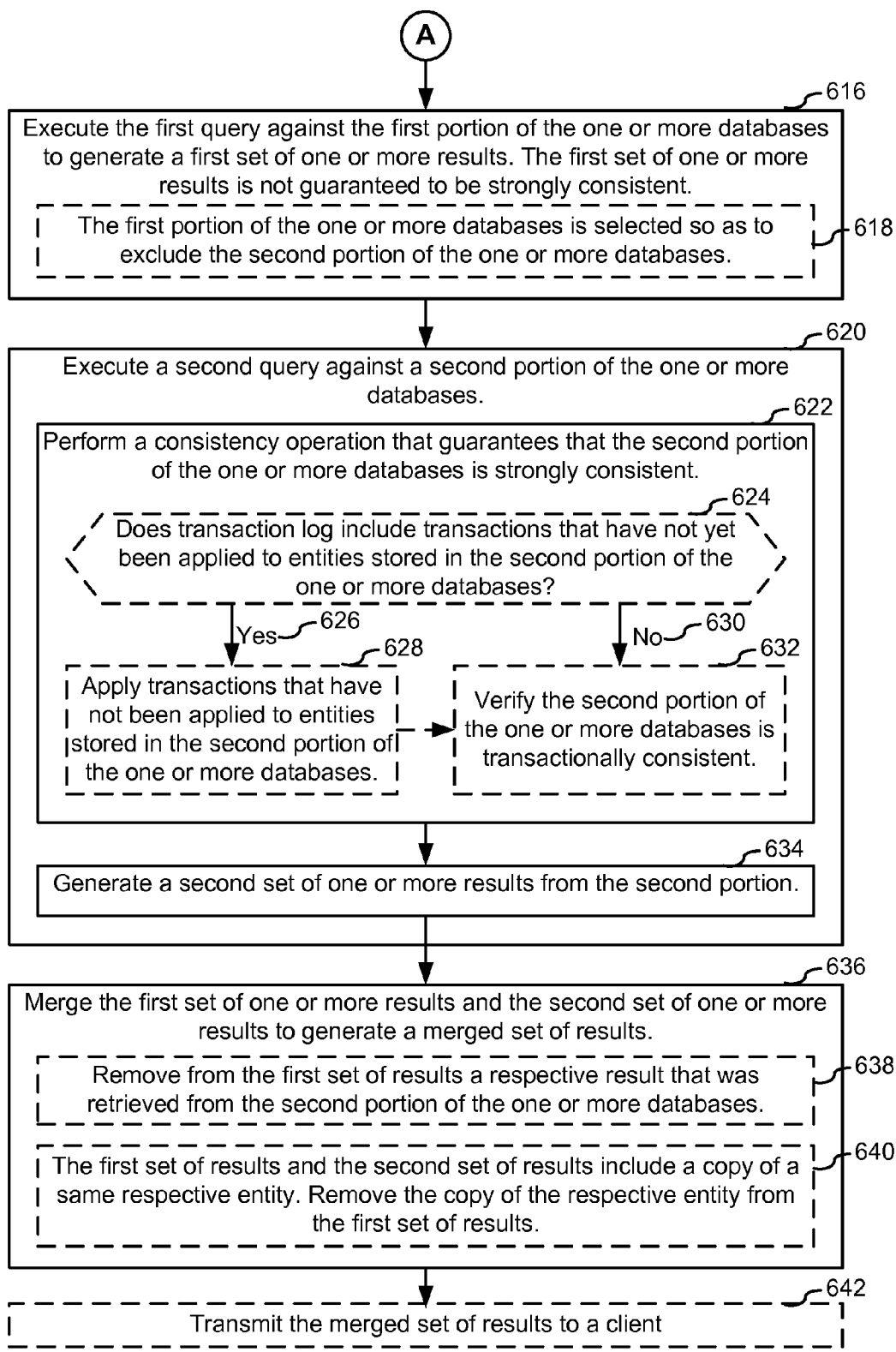

FIGS. 6A-6B include a flowchart representing a method for executing a query at a server system, according to certain embodiments. Method 600 is, optionally, governed by instructions that are stored in a non-transitory computer readable storage medium and that are executed by one or more processors of one or more servers (e.g., Server 106, FIG. 3). In some implementations, each of the operations shown in FIGS. 6A-6B corresponds to instructions stored in a computer memory or non-transitory computer readable storage medium (e.g., memory 306 of Server 106 in FIG. 3). In some implementations, the computer readable storage medium includes a magnetic or optical disk storage device, solid state storage devices such as Flash memory, or other non-volatile memory device or devices. In some implementations, the computer readable instructions stored on the computer readable storage medium include one or more of: source code, assembly language code, object code, or other instruction format that is interpreted or executed by one or more processors. In various embodiments, some operations in method 600 may be combined and/or the order of some operations may be changed from the order shown in FIGS. 6A-6B.

A plurality of entities is stored (602) in one or more databases. In some embodiments, the one or more databases are stored across one or more Servers 106 (e.g., Server 106-A and Server 106-N in FIG. 1). Strong consistency of these entities is not guaranteed by the one or more databases.

In some embodiments, the plurality of the entities stored in the one or more databases are organized (604) in groups, a respective group having one or more entities. In some embodiments, the entities in a group include information that indicates those entities are part of the group. In some embodiments, the information indicating that entities are part of a respective group includes one or more of: a predefined parameter specifying that the entities are part of the respective group (for example, Group ID 404 in FIGS. 4A-4B), a shared group key, or a common ancestor key if the one or more databases are organized in a tree-like structure and a respective key for a child entity includes a representation of a respective key of a parent entity.

In some embodiments, the one or more databases include (606) a first replica and a second replica of a respective database. In some situations, the first replica and the second replica are not fully synchronized. For example, when a respective entity is deleted from a first database replica, the respective entity continues to exist on a second database replica until the second database replica is synchronized with the first database replica. In some embodiments, data operations requested but not yet applied to a database, or applied to one database replica but not applied to all of the replicas of the database are recorded in one or more transaction logs. Thus, in some embodiments, applying the data operations in the one or more transaction logs that are associated with entities in a respective portion of the database will guarantee that the respective portion of the database is strongly consistent (e.g., up-to-date).

In some embodiments, Server 106 receives (608) a client-specified query. In some embodiments, Server 106 generates (610) a first query and a second query from the client-specified query, where the first query is to be executed against a first portion of the one or more databases and the second query is to be executed against a second portion of the one or more databases. In some embodiments, the first query and the second query are received from a client or are generated based on a system-specified query.

In some embodiments, the first query and the second query are generated from the client-specified query (612) based on syntax of the client-specified query that indicates that a portion of query results to be returned in response to the client-specified query requires guaranteed strong consistency with respect to the second portion of the one or more databases. As described in greater detail above, in some embodiments, the entities are grouped into groups of entities (e.g., by Group ID, ancestor key or the like). Thus, in some of these embodiments, the second portion of the one or more databases is selected to include at least a respective group of entities from the entities stored in the one or more databases (e.g., all of the entities having Group IDs indicating that the entities are associated with the user "Gilbert").

As one example of syntax that specifies that a portion of query results are to be strongly consistent, Server 106 receives a query such as {retrieve entities where Type=blog comment AND StronglyConsistent (user=Gilbert)}, Server 106 will retrieve a set of results corresponding to entities that are blog comments where the results are strongly consistent for a portion of the entity database where "user=Gilbert" and the results are eventually consistent for other portions of the entity database. In some embodiments, a portion of the entity database where "user=Gilbert" is identified by identifying an index portion (e.g., having a Group ID=Gilbert) of an index sorted by Group ID. In some embodiments, a portion of the entity database where "user=Gilbert" is identified by identifying entities having a key that includes a unique identifier (e.g., ancestor key) corresponding to an entity that is representative of "Gilbert."

In some embodiments, strong consistency is not required for any portion of a query unless specifically requested or indicated (for example, by the syntax shown above). In other words, in some embodiments queries are executed without guaranteed strong consistency by default. In some embodiments, the first query and the second query are generated (614) based on a determination by Server 106, in accordance with predefined criteria, that a portion of the merged set of results returned in response to the client-specified query is to be strongly consistent with respect to the second portion of the one or more databases. In some embodiments Server 106 determines that strong consistency is required with respect to a portion of the client-specified query because that portion of the client-specified query has a high likelihood of lacking strong consistency.

In some embodiments, in some situations Server 106 determines that strong consistency is required with respect to a respective portion of the client-specified query because a lack of strong consistency in the results would be highly visible and undesirable to a user, even though the client-specified query received by Server 106 does not explicitly request that the respective portion of the results be strongly consistent. For example, a client-specified query requests recent blog comments including blog comments by the current user. In this example, Server 106 will determine that a portion of the client-specified query retrieving blog comments by the current user is to be strongly consistent because the user would notice if a recently added blog comment was not returned as one of the results, if a recently deleted blog comment was returned as one of the results and/or if a recently modified blog comment was returned without modifications made by the user. In contrast, a portion of the client-specified query for retrieving blog comments made by other users will not, in many situations, be strongly consistent, as the user will not typically notice the lack of strong consistency for other users' blog comments.

Server 106 executes (616) the first query against a first portion of the one or more databases to generate a first set of one or more results. In some embodiments, the first set of one or more results is not guaranteed to be strongly consistent. In some embodiments, the first portion of the one or more database is selected (618) so as to exclude the second portion of the one or more databases (e.g., "pre-filtering" the first set of results so as to remove results from the first set of results that would have been retrieved by the second search query). For example, after determining that the second query is to be a strongly consistent query executed against a second portion of the one or more databases, Server 106 excludes the second portion of the one or more databases from the first portion of the databases before executing the first query. In some embodiments, second portion of the one or more databases is not excluded from the first portion of the one or more databases. In some implementations, the second portion of the databases is a subset of the first portion of the one or more databases and the results from the first query are filtered after performing the first search query (e.g., "post-filtering" the first set of results so as to remove results that would have been retrieved by the second query, as described in greater detail below).

Concurrently with or in sequence with (e.g., before or after) the execution of the first query, Server 106 executes (620) the second query against the second portion of the one or more databases. While executing the second query, Server 106 performs (622) a consistency operation that guarantees the second portion of the one or more databases to be strongly consistent. In some embodiments, the consistency operation includes determining (624) whether a transaction log includes write operations that have been requested but not yet applied to entities stored in the second portion of the one or more databases. If the determination is Yes (626), (e.g., transaction log does include write operations that have been requested but not applied to entities stored in the second portion of the one or more databases), Server 106 applies (628) the write operations that have not been applied and then verifies (632) that the second portion of the one or more databases is strongly consistent. In contrast, if the transaction log does not include any write operations that have been requested but not applied to entities stored in the second portion (e.g., the determination is No (630)), Server 106 verifies (632) that the second portion of the one or more databases is strongly consistent. However, when there are no transactions in the transaction log that need to be applied to guarantee strong consistency (e.g., transactions that relate to entities in the second portion of the one or more databases), the consistency operation does not necessarily include applying any transactions from the transaction log. In other words, the consistency operation is an operation that guarantees that the second portion of the database is strongly consistent and, if necessary, applies transactions from transaction logs to make the second portion strongly consistent. After performing the consistency operation and verifying the second portion to be strongly consistent, Server 106 generates (634) the second set of one or more results from the second potion of the one or more databases.

After generating the first set of results and the second set of results, Server 106 merges (636) the first set of the results and the second set of the results to generate a merged set of results. In some embodiments, before the first set of the results and the second set of results are merged, some results from the first set are removed (e.g., so as to remove duplicate results in the first set of results that are also in the second set of results). In some embodiments, all results in the first set of results that were retrieved from the second portion of the one or more databases are removed (638) from the first set of results. In other words, when the first set of results includes entities retrieved from the second portion of the one or more databases (e.g., results with Group ID=Gilbert or some other identifier that identifies the results as being associated with entities from the second portion of the one or more databases), these entities are removed from the first set of results before it is merged with the second set of the results. In some embodiments, the key of an entity is used to determine which portion of the databases a respective entity was retrieved from. For example, in FIG. 4D Entities 701 and 2 both have a group ID (Group ID=Gilbert) that indicates that Entities 701 and 2 are retrieved from the second portion of the one or more databases. In this example, Entities 701 and 2 are identified as being from the second portion of the database based on their Group ID (e.g., Group ID=Gilbert) and are thus removed from Query Results 416 before Query Results 416 is merged with Query Results 420 to produce the merged set of Query Results 422.

In some embodiments, if the first set of results and the second set of results both include a copy of a same respective entity, the respective entity is removed (640) from the first set of results before the results are merged. For another example, in FIG. 4D, Entity 2 is included in both Query Results 416 and Query Result 420. In this example, Entity 2 is identified as being from the second portion of the one or more databases based on a determination that it has a same unique identifier (e.g., key=31) as an entity in the results generated by the second query (which was performed against the second portion of the one or more databases) and is thus removed from Query Results 416 before Query Results 416 is merged with Query Results 420 to produce the merged set of Query Results 422. After generating the merged set of results, in some embodiments (e.g., when merged set of results is responsive to a client-specified query), the merged set of results is transmitted (642) to a client (e.g., the client from which the client-specified query was received).

Thus, in some implementations, Client 102 submits a search query, and Server 106 executes multiple queries subject to different consistency requirements and produces a merged set of results that includes both some results with guaranteed strong consistency and some results that are not guaranteed to have strong consistency. These merged results can be produced without requiring application of all of the transactions in all of the transaction logs to the entire database, while still guaranteeing strong consistency for a portion of the results. Consequently, in these implementations, Client 102 is provided with results that have variable consistency and are guaranteed to be strongly consistent where a user of Client 102 is likely to notice a lack of strong consistency and are not guaranteed to be strongly consistent (e.g., are eventually consistent) where the user is not likely to notice a lack of strong consistency. Consequently, by producing a merged set of results with variable consistency, computing resources are conserved (e.g., by not guaranteeing strong consistency for all of the results), while providing a user with results that have expected consistency characteristics (e.g., results where the user is likely to notice inconsistencies are guaranteed to be strongly consistent).

It should be understood that the particular order in which the operations in FIGS. 6A-6B have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 500 (described herein with reference to FIG. 5) are also applicable in an analogous manner to method 600 described above with respect to FIGS. 6A-6B. For example, the client-specified query, consistency operation, portions of the databases, and search results described above with reference to method 600 may have one or more of the characteristics of the client-specified query, consistency operation, portions of the databases, and search results described herein with reference to method 500. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A method comprising:
   at a server system having one or more processors and memory storing one or more programs that when executed by the one or more processors cause the server system to perform the method, the method comprising:
storing a plurality of entities in one or more databases, wherein the one or more databases do not guarantee strong consistency of the stored entities;
obtaining a first query and a second query, wherein the second query has a greater consistency requirement than the first query; and
in response to obtaining the first query and the second query:
executing the first query against a first portion of the one or more databases to generate a first set of one or more results corresponding to at least a subset of the plurality of entities, wherein the first set of one or more results is not guaranteed to be strongly consistent;
prior to searching the second portion of the one or more databases in accordance with the second query, performing a consistency operation in accordance with the consistency requirement of the second query, the consistency operation guaranteeing that a second portion of the one or more databases is strongly consistent;
after performing the consistency operation, executing the second query by searching the second portion of the one or more databases in accordance with the second query to obtain a second set of one or more results corresponding to entities from the second portion; and
merging the first set of one or more results and the second set of one or more results.

2. The method of claim 1, wherein obtaining the first query and the second query comprises:
receiving, from a client, a client-specified query; and
in response to the client-specified query, generating the first query and the second query based on the client-specified query; and
the method further comprises, after merging the first set of results and the second set of results, sending a merged set of results to the client.

3. The method of claim 2, wherein the first query and the second query are generated based on syntax in the client-specified query indicating that a portion of the merged set of results returned in response to the client-specified query are required to be strong-consistency guaranteed with respect to the second portion of the one or more databases.

4. The method of claim 2, wherein the first query and the second query are generated based on a determination by the server system, in accordance with predefined criteria, that a portion of the merged set of results returned in response to the client-specified query are to be strong-consistency guaranteed with respect to the second portion of the one or more databases.

5. The method of claim 1, wherein the first portion of the one or more databases is selected so as to exclude the second portion of the one or more databases, and wherein the consistency operation comprises applying one or more operations from a transaction log to entities in the second portion.

6. The method of claim 1, further comprising, prior to merging the first set of results and the second set of results, removing from the first set of results a respective result that was retrieved from the second portion of the one or more databases.

7. The method of claim 1, wherein:
the first set of results and the second set of results include a copy of a same respective entity; and
the method further comprises, before merging the first set of results and the second set of results, removing the copy of the respective entity from the first set of results.

8. The method of claim 1, wherein:
the server system stores a transaction log that includes write operations requested but not yet applied to the entities stored in the one or more databases; and
the consistency operation comprises:
determining whether the transaction log includes write operations that have not yet been applied to entities stored in the second portion; and
in accordance with a determination that the transaction log includes the write operations that have not yet been applied to entities stored in the second portion, applying the one or more write operations from the transaction log to entities in the second portion.

9. The method of claim 8, wherein the consistency operation comprises:
in accordance with a determination that the transaction log does not include any write operations that have not yet been applied to entities stored in the second portion, verifying that the second portion is strongly consistent.

10. The method of claim 1, wherein:
the plurality of entities in the one or more databases are organized as a plurality of groups of entities;
the second portion includes a respective group of entities in the plurality of entities; and
the entities in the respective group include information indicating that the entities are part of the respective group.

11. The method of claim 1, wherein:
the one or more databases include a first replica of a database and a second replica of the database; and
the first replica of the database is synchronized with the second replica of the database according to a predefined schedule.

12. A server system, comprising:
one or more processors;
memory; and
one or more programs, wherein the one or more programs are stored in the memory and configured to be executed by the one or more processors, the one or more programs including instructions for:
storing a plurality of entities in one or more databases, wherein the one or more databases do not guarantee strong consistency of the stored entities;
obtaining a first query and a second query, wherein the second query has a greater consistency requirement than the first query; and
in response to obtaining the first query and the second query:
executing the first query against a first portion of the one or more databases to generate a first set of one or more results corresponding to at least a subset of the plurality of entities, wherein the first set of one or more results is not guaranteed to be strongly consistent;
prior to searching the second portion of the one or more databases in accordance with the second query, performing a consistency operation in accordance with the consistency requirement of the second query, the consistency operation guaranteeing that a second portion of the one or more databases is strongly consistent;
after performing the consistency operation, executing the second query by searching the second portion of the one or more databases in accordance with the second query to obtain a second set of one or more results corresponding to entities from the second portion; and merging the first set of one or more results and the second set of one or more results.

13. The system of claim 12, wherein obtaining the first query and the second query comprises:
receiving, from a client, a client-specified query; and
in response to the client-specified query, generating the first query and the second query based on the client-specified query; and
the one or more programs further include instructions for, after merging the first set of results and the second set of results, sending a merged set of results to the client.

14. The system of claim 13, wherein the first query and the second query are generated based on syntax in the client-specified query indicating that a portion of the merged set of results returned in response to the client-specified query are required to be strong-consistency guaranteed with respect to the second portion of the one or more databases.

15. The system of claim 13, wherein the first query and the second query are generated based on a determination by the server system, in accordance with predefined criteria, that a portion of the merged set of results returned in response to the client-specified query are to be strong-consistency guaranteed with respect to the second portion of the one or more databases.

16. The system of claim 12, wherein the first portion of the one or more databases is selected so as to exclude the second portion of the one or more databases, and wherein the consistency operation comprises applying one or more operations from a transaction log to entities in the second portion.

17. A non-transitory computer readable storage medium storing one or more programs, the one or more programs comprising instructions, which when executed by a computer system with one or more processors, cause the computer system to:
store a plurality of entities in one or more databases, wherein the one or more databases do not guarantee strong consistency of the stored entities;
obtain a first query and a second query, wherein the second query has a greater consistency requirement than the first query; and
in response to obtaining the first query and the second query:
execute the first query against a first portion of the one or more databases to generate a first set of one or more results corresponding to at least a subset of the plurality of entities, wherein the first set of one or more results is not guaranteed to be strongly consistent;
prior to searching the second portion of the one or more databases in accordance with the second query, perform a consistency operation in accordance with the consistency requirement of the second query, the consistency operation guaranteeing that a second portion of the one or more databases is strongly consistent;
after performing the consistency operation, execute the second query by searching the second portion of the one or more databases in accordance with the second query to obtain a second set of one or more results corresponding to entities from the second portion; and
merge the first set of one or more results and the second set of one or more results.

18. The non-transitory computer readable storage medium of claim 17, wherein obtaining the first query and the second query comprises:
receiving, from a client, a client-specified query; and
in response to the client-specified query, generating the first query and the second query based on the client-specified query; and
the one or more programs further including instructions to, after merging the first set of results and the second set of results, send a merged set of results to the client.

19. The non-transitory computer readable storage medium of claim 18, wherein the first query and the second query are generated based on syntax in the client-specified query indicating that a portion of the merged set of results returned in response to the client-specified query are required to be strong-consistency guaranteed with respect to the second portion of the one or more databases.

20. The non-transitory computer readable storage medium of claim 18, wherein the first query and the second query are generated based on a determination by the computer system, in accordance with predefined criteria, that a portion of the merged set of results returned in response to the client-specified query are to be strong-consistency guaranteed with respect to the second portion of the one or more databases.

21. The non-transitory computer readable storage medium of claim 17, wherein the first portion of the one or more databases is selected so as to exclude the second portion of the one or more databases, and wherein the consistency operation comprises applying one or more operations from a transaction log to entities in the second portion.

* * * * *